United States Patent [19]

Jester et al.

[11] 4,079,620
[45] Mar. 21, 1978

[54] METHOD AND APPARATUS FOR LOCATING DEFECTIVE FUEL RODS OF A REACTOR FUEL ELEMENT

[75] Inventors: Alfred Jester, Speyer; Uwe Heidtmann, Nussloch; Hermann Birnbreier, Heidelberg, all of Germany

[73] Assignees: Babcock-Brown Boveri Reaktor GmbH; Brown, Boveri & Cie Aktiengesellschaft, both of Mannheim, Germany

[21] Appl. No.: 656,275

[22] Filed: Feb. 9, 1976

[30] Foreign Application Priority Data

Feb. 11, 1975 Germany .............................. 2505645

[51] Int. Cl.² ...................... G01N 25/00; G21C 17/00
[52] U.S. Cl. ............................ 73/15 FD; 176/19 LD
[58] Field of Search ................. 176/19 R, 19 LD, 80; 73/355, 15 FD; 250/341, 342, 347, 334

[56] References Cited

U.S. PATENT DOCUMENTS

| 3,526,135 | 9/1976 | Wortz ................................. 250/341 |
| 3,583,223 | 6/1971 | Olsson ................................ 73/355 R |
| 3,801,441 | 4/1974 | Jones ................................. 176/14 R |
| 3,878,040 | 4/1975 | Martucci .......................... 176/19 LD |
| 3,936,348 | 2/1976 | Wachter et al. ................. 176/19 LD |
| 3,940,313 | 2/1976 | Steven ..................................... 176/80 |
| 3,945,245 | 3/1976 | Stehle et al. .................... 176/19 LD |

OTHER PUBLICATIONS

S1309 0111, Am. Ceram. Soc. Bull., vol. 49, No. 9 (1970) pp. 777-781.

*Primary Examiner*—Samuel W. Engle
*Assistant Examiner*—S. A. Cangialosi
*Attorney, Agent, or Firm*—Herbert L. Lerner

[57] ABSTRACT

A method and apparatus for locating defective fuel rods of a liquid cooled reactor core wherein the rods have end caps and defective rods collect leakage liquid from the core in the end caps, includes heating the end caps of a plurality of rods to evaporate the leakage liquid, measuring the temperatures of the end caps of the plurality of rods, and simultaneously indicating the temperature differences between defective and non-defective rods. The rods are supported in a container filled with a liquid and the upper ends of the rods and end caps are enclosed within the container in a dry heated temperature. The apparatus includes means for heating the end caps, means for measuring the temperatures and means for simultaneously indicating the temperatures and temperature differences.

11 Claims, 5 Drawing Figures

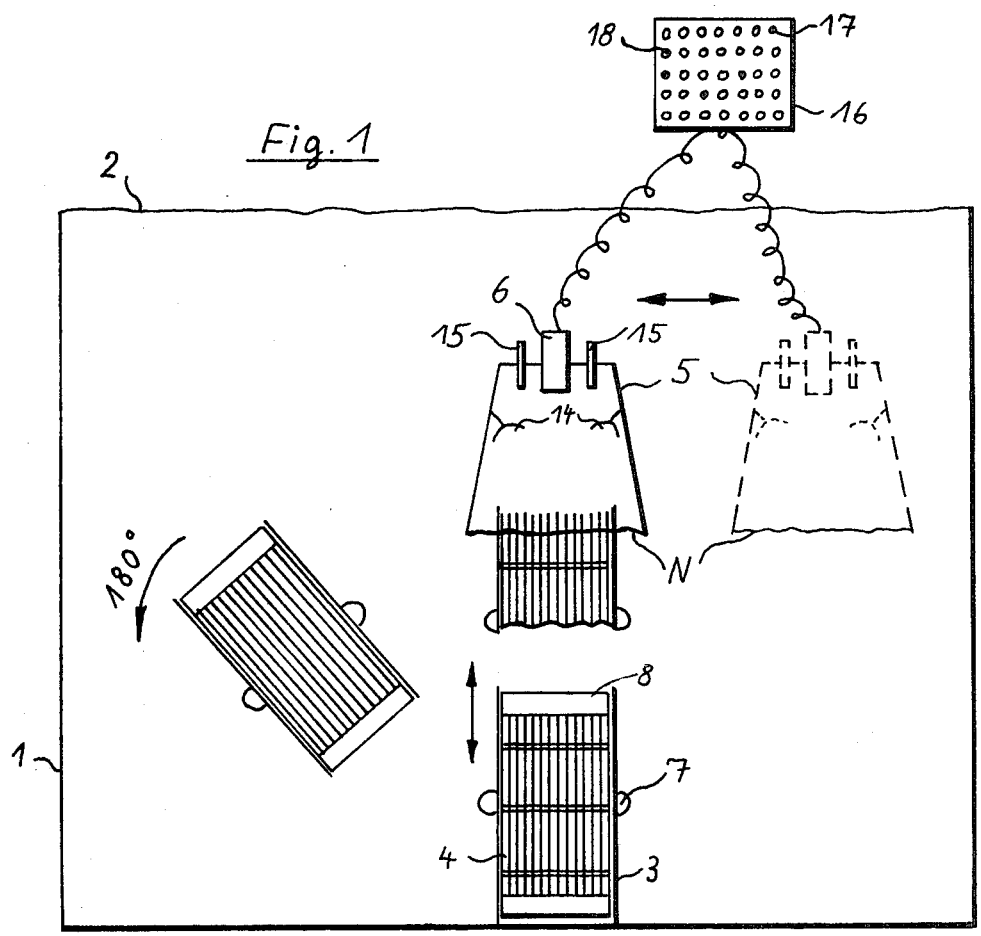
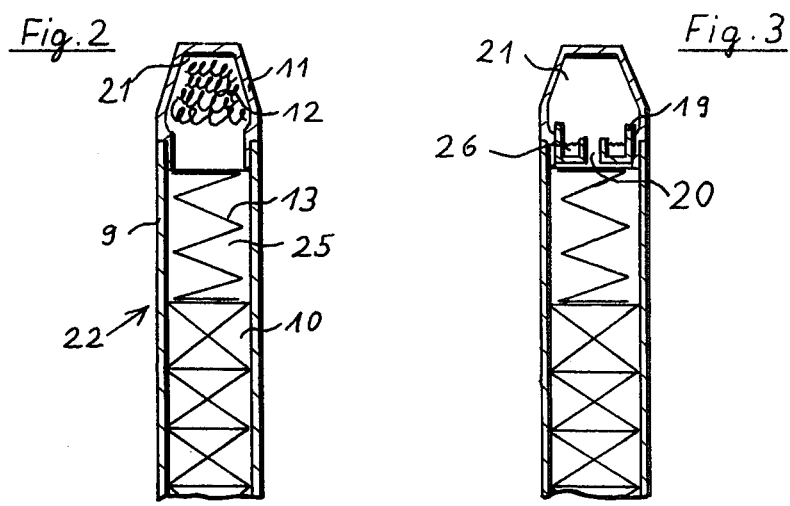

METHOD AND APPARATUS FOR LOCATING DEFECTIVE FUEL RODS OF A REACTOR FUEL ELEMENT

BACKGROUND OF THE INVENTION

1. Field of the Invention

This invention relates to a method and apparatus for locating defective fuel rods which are combined into fuel elements and are used in water cooled reactor cores.

2. Description of the Prior Art

The core of a water cooled reactor consists of approximately 40 – 50 thousand fuel rods which are combined to form groups of approximately 200 pieces known as fuel elements. A fuel element consists of two end pieces, the guide tubes for housing the the control or positioning rods, the spacing devices for positioning the fuel rods, and the fuel rods. The fuel rods, whose covering is made of Zircaloy-4, contain the core fuel in the form of oxides and are closed on both ends by welded end caps.

In operation, localized sealing problems or looseness occurs in individual rods. This may cause a discharge of fission products in gas form into the flow of coolant medium and thereby increase its radioactivity.

To a certain extent, fission products in the cooling system can be tolerated. However, it is desirable to keep their amount low because of the radiation density in the vicinity of the reactor cooling system.

Because of this problem, the fuel elements are routinely tested during each fuel element change by a known "Sipping" test. In this test, the fuel element in the fuel element storage basin is placed under water in a container. The fuel rods and the water in the container heat up due to the heat from radioactive decay. If this fuel element contains defective rods, radioactive fission products are discharged by the defective rods during the heating and get into the water. By withdrawal of water samples and measurement of their radioactivity, it can be determined if the element contains defective rods. This procedure is an integral method, in that it only determines if a fuel element contains any defective rods; however, it does not give information as to their position. In order to restore a fuel element with defective rods to service, it is necessary to locate the defective rods in the fuel element, thereafter to pull them out and to fill the open positions with new rods or dummy rods. In the known procedure for locating defective fuel rods, all rods of a fuel element are successively completely or partially pulled and examined for defects by means of turbulent eddy currents or ultrasonic tests. The rods which are free of defects, are again inserted into the fuel element and the defective rods are replaced. This procedure is very time-consuming and complicated. A further disadvantage is that all rods have to be removed or partially removed from the fuel element for testing. During pulling and re-insertion of the rods, the spacers cause scratches and grooves on the covering tubes which can be the starting point for later fuel rod defects.

In addition, as described in German Patent No. 2 314 650, another method is known wherein the rod cover tube is heated beneath the end cap by high frequency energy. The water within the heating zone steams off and the presence of water inside of the fuel rod can be deducted from the temperature behavior at the end cap. This method has the disadvantage that the fuel rods can only be tested individually or in small groups. Considerable difficulties are thereby encountered in order to manipulate the heating coil over the 11 mm diameter fuel rod through a water layer of several meters in thickness.

It has also been shown to be a disadvantage that the temperature-time cycle of each fuel rod must be measured individually which results in a time period of several minutes per rod. A considerable time will pass until all fuel rods of a fuel element are tested, so that it is difficult to test all fuel elements which contain defective fuel rods during a fuel element replacement cycle.

SUMMARY OF THE INVENTION

It is therefore the object of the invention of the present application to provide a method and apparatus which provide fast and simultaneous detection of all defective fuel rods within a fuel element.

The solution of this problem is obtained by use of leakage water that collects in a capillary structure disposed in the end cap cavities and which is evaporated by heating of the end cap. After reaching the boiling temperature in the end cap cavities, all defective rods of a fuel element are simultaneously detected by a temperature measuring device with an associated monitor. Preferably, an infra-red temperature measuring device is used for the temperature measurement.

With the foregoing and other objects in view there is provided in accordance with the invention, a method for locating defective fuel rods of a liquid cooled reactor core wherein the rods have end caps and defective rods collect leakage liquid from the core in the end caps including heating the end caps of a plurality of rods to evaporate the leakage liquid, measuring the temperatures of the end caps of the plurality of rods, and simultaneously indicating the temperatures of the end caps to detect the temperature differences between defective and non-defective rods.

In accordance with another feature of the method of the invention, the plurality of rods are supported in a container filled with a liquid, and the upper ends of the rods and end caps are enclosed within the container in a dry heated atmosphere.

In accordance with a further feature of the method of the invention, the rods are turned 180° from the normal position in the core so that the end caps with the leakage liquid are at the upper ends of the rods in the container.

In accordance with still another feature of the method of the invention, a heated gas is passed over the enclosed end caps to provide the dry heated atmosphere.

In accordance with the invention, apparatus utilizing the foregoing method for locating defective fuel rods of a liquid cooled reactor core includes a container filled with a liquid, a plurality of fuel rods supported in the container, the rods including end caps, defective ones of the rods having leakage liquid from the core collected in the end caps, means for heating the end caps of the rods to evaporate the leakage liquid, means for measuring the temperatures of the end caps of the rods, and means for simultaneously indicating the temperatures of the end caps to detect the temperature differences between defective and non-defective rods.

In accordance with another feature of the apparatus of the invention, means are included for supporting the rods in the container with the end caps having the leakage liquid being disposed at the upper ends of the rods, the means for heating the end caps including means for enclosing the upper ends of the rods in the container in a dry atmosphere.

In accordance with a further feature of the apparatus of the invention, the means for enclosing the upper ends of the rods includes an enclosure, and a source of heated gas connected to the enclosure.

In accordance with an added feature of the apparatus of the invention, a capillary element is included within the end caps to collect the leakage liquid.

In accordance with an additional feature of the apparatus of the invention, a heat radiating element is included within the enclosure.

In accordance with a concomitant feature of the apparatus of the invention, a cup shaped element is included within the end caps to collect the leakage liquid.

In accordance with a still further feature of the apparatus of the invention, the rods include fission gas spaces adjacent the end caps collecting further leakage liquid, the capillary element having an extension into the fission gas spaces.

In accordance with still another feature of the apparatus of the invention, the means for measuring temperatures includes an infrared measuring device, and the means for simultaneously indicating the temperatures includes a visual display device connected to the infrared device and displaying the end cap temperatures as an array of light and dark areas representing the temperature differences between defective and non-defective rods during a given period of time.

In operation, the water, which originally fills the inner space of the enclosure is displaced by means of the gases discharging from the hot gas sources and is kept on a level N below the upper end of the rods.

In order to avoid the formation of steam within the bell and the resultant malfunction of the instruments and apparatus mounted therein, the inner space of the bell should be kept dry and free of water by the flow of gas until the testing of all fuel elements is completed. By means of a travelling crane arranged above the fuel element storage basin, the bell is kept at a constant height and is moveable in the horizontal direction.

The hot gas flow and/or a heat source are used for heating the top surfaces of the end caps to evaporate, in the form of steam, the leakage water drawn up by the capillary structure. In order to save energy, gas at room temperature can flow from the hot gas sources during the water displacement process.

It has been shown to be advantageous to make the capillary structure of a net or felting of a metal material or a porous ceramic plate.

The capillary structure is disposed in one or both end cap cavities of a fuel rod. The water that has entered a defective fuel rod will usually collect in the lower part of the fuel rod.

Therefore, it has been shown to be practical to place the fuel element under the test apparatus turned at an angle of 180° to its position in the reactor core. For this purpose, the fuel element is placed into a fixture which is disposed in the fuel element storage basin and locked. The fixture, including the fuel element are turned 180° with the aid of known handling devices.

The fuel rod ends which are in the lower end of the reactor core, are thus the upper rod ends in the test apparatus. The water which has entered, will run downward following the laws of gravity. Only the water trapped in the capillary structure will remain there and serve its purpose as indicator for defective rods.

Instead of the capillary structure, a pot-shaped sheet metal cup can be mounted in the end cap cavities, which cup also ensures that a predetermined amount of leakage water is retained in the end cap cavities after turning the fuel element 180°.

In some cases, excess water can occur in the fuel rod so that the capillary structure and the fission gas space are filled with water. The method according to the invention can also be used in this case, except that it will take longer to reach the boiling point in the end cap cavity due to the greater thermal capacity.

After completion of a fuel cycle, approximately 30% of the core charge is exchanged as burned out and approximately 70% remains in place, and is exchanged within the core.

If this 70% is tested for defective rods within the core, a further time-saving results since the fuel elements are not transported to the fuel element storage basin.

Therefore, a wick is included to protrude from the capillary structure in the upper rod end into the fission gas space in order to draw up the leakage water collected in the gas space.

The bell is then positioned within the flooded core region above the fuel element to be tested.

However, this arrangement can be used only when water has collected in the upper fission gas space of the defective rods. Therefore, only badly damaged rods can be detected by this variation of the method.

It is also possible to proceed in such a manner that, after the first fuel element cycle, the testing is done within the core to detect the badly damaged rods, and after the second fuel element cycle, the testing is done in the fuel element storage basin to detect the less defective fuel elements.

Other features which are considered as characteristic for the invention are set forth in the appended claims.

Although the invention is illustrated and described herein as embodied in a method and apparatus for locating defensive fuel rods of a reactor fuel element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

BRIEF DESCRIPTION OF THE FIGURES

FIG. 1 is a diagrammatic view of the method and apparatus for locating defective fuel rods according to the invention.

FIG. 2 is a schematic cross-sectional view of an end portion of a fuel rod used in connection with the apparatus of FIG. 1, FIG. 3 is a schematic cross-sectional view of an end portion of another embodiment of a fuel rod used with the apparatus of FIG. 1.

DESCRIPTION OF THE PREFERRED EMBODIMENTS

Figure 4:
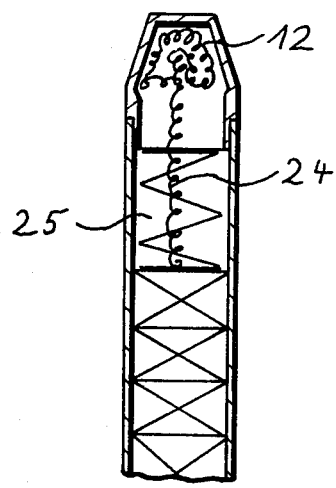
FIG. 4 is a schematic cross-sectional view of an end portion of a fuel rod showing a wick extending into the fission gas space.

FIG. 1 shows a water basin 1 which is filled to level 2. The basin serves, among other uses, as a container for storing radiated fuel elements. Disposed within the basin is a fixture 3 which holds a fuel element 4 to be tested. The fuel element is placed in the fixture by means of known lifting devices and is secured by locking elements which are not shown. The lifting devices are equipped with suitable manipulating mechanisms by which the fixture 3 with the fuel element 4 therein is turned 180°. During the time when the fixture containing the fuel element is manipulated, the bell enclosure 5 is moved or rolled to the side into the dotted position. Also in this position, the end piece 8 is removed to provide access to the fuel rod to be tested. During this time, the inner space of the bell is kept dry and free of water by gas flow from tube 15 which connects to a hot gas source, not shown. Steam formation which could interfere with the function of the infra-red measuring instrument 6 is thereby avoided. The bell 5 is then moved by an overhead crane (not shown) to the position shown by the solid line in the figure. The fixture 3, with the fuel element 4 secured therein, is raised vertically by the lifting devices (not shown) which attach in eye lugs 7, so that the fuel rods extend into the bell approximately 30 – 100 mm above level N.

FIG. 2 shows an end portion of a fuel rod 22 with a cover tube 9. Included therein are the fuel pellets 10, the welded end caps 11, with the capillary structure 12 disposed in cavity 21, and the spacing springs 13 within the fission gas space or chamber 25.

Another embodiment of the leakage water collecting zone in end cap cavity 21 is shown in FIG. 3. A pot-shaped cup 19 made of sheet metal has a configuration which permits the steam formed therein to escape through aperture 20 and the leakage water is collected in the annular space 26.

FIG. 4 shows an embodiment of the capillary structure having a wick 24 which protrudes into the fission gas space to remove leakage water therefrom.

The radiating heat sources 14 and/or the hot gas stream flowing through the ends of tube 15 disposed in bell 5, uniformly heat the upper surfaces of the end caps. During the operation of the reactor, cooling water leaks into all defective fuel rods and is collected in the lower region of the fuel rod after shut-down of the reactor.

The capillary structure 12 within the end cap cavity 21 draws up this water and saturates. This capillary structure is also disposed within the end caps 11 which protrude into the bell after the fuel element has been turned 180°. All defective fuel rods contain approximately the same amount of leakage water in the capillary structure. As a result, when heat is applied to the upper surface of the end caps of all end cap cavities containing defective rods, boiling temperatures occur at approximately the same time. It will also take a definite period of time until the leakage water is evaporated as steam. During this time, due to heat loss from evaporation, the top surface of the end caps will remain at a temperature of approximately 100° C, despite the continued heat input from the heat radiating sources 14. The heat sources are so arranged that they are capable of heating the upper surfaces of the end caps of the undamaged rods to at least 125° C. The temperature difference and the time period of the evaporation cycle depend upon the heat requirements. A temperature difference of approximately 25° C will thus result between non-defective and defective rods.

Figure 5:
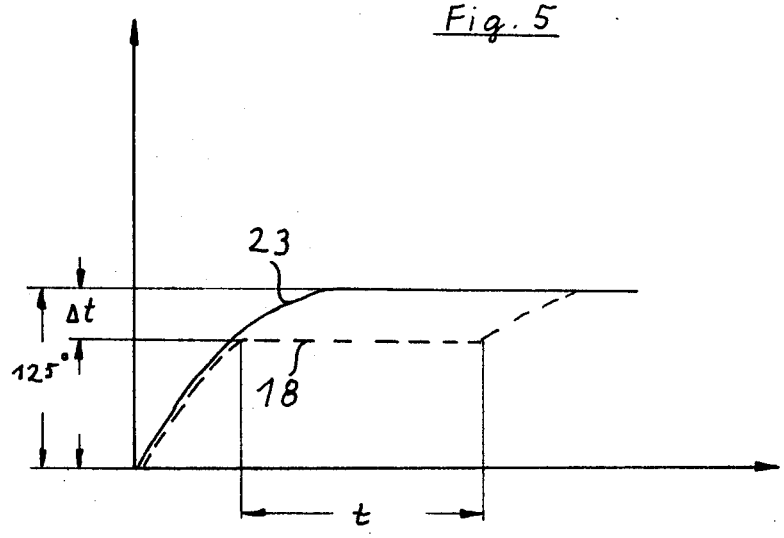
FIG. 5 shows a plot diagram of different temperature characteristics for defective and non-defective rods over a given time period.

FIG. 5 shows a plot diagram of the temperature behavior of the top surfaces of the end caps for defective and non-defective rods. At first, the temperature rises uniformly in all end caps. Following the start of the steaming action, the end cap temperature of the defective rods remains at the boiling temperature during the time period t, as shown by Curve 18. The end cap temperature of non-defective rods, however, continues to rise to approximately 125° C, as in Curve 23. At the end of the steaming cycle, the end cap temperature of the defective rods also rises to the temperature of non-defective rods, since there is no more water in the capillary structure.

After reaching the boiling point, a measurement is taken, for example, by an infra-red temperature measuring device 6, connected to a suitable monitor 16. The monitor provides a display which shows the position of all defective rods at one time. Due to the temperature difference, the defective rods appear as dark areas 17 and the non-defective rods as bright areas 18.

The method of the invention thus has the advantage over the known prior art methods in that all the defective fuel rods of a fuel element can be detected simultaneously in a simple manner. The images of all rod ends are projected onto the monitor with a common display. The measuring system thus operates completely without direct contact.

The above described method is not limited only to fuel elements of water-cooled reactors, but is also applicable to fuel elements of all liquid-cooled reactor types.

Furthermore, it is to be noted that the monitoring of the different temperatures is not limited to an infra-red device and any suitable temperature measuring instrument may be used in this manner.

There are claimed:

1. A method for locating defective fuel rods of a fuel element having a plurality of fuel rods in a liquid cooled reactor core wherein the rods have end caps, the end caps located in the lower end of the reactor core and leakage liquid from the core being collected by gravity flow in the end caps of the defective fuel rods, comprising:
   retaining the leakage liquid in the respective end caps of the defective rods and rotating the rods through substantially 180°;
   heating the thus raised end caps of the rods to evaporate the leakage liquid in the end caps of the defective rods while maintaining the end caps free from surrounding cooling liquid in contact with substantially the remainder of the fuel element, measuring the temperatures of the end caps of the rods, and simultaneously indicating the temperatures of the end caps to detect the temperature differences between defective and nondefective rods.

2. The method of claim 1 including supporting the plurality of rods in a container filled with a liquid, and enclosing the upper ends of the rods and end caps within the container in a dry heated atmosphere.

3. The method of claim 2 including passing a heated gas over the enclosed end caps to provide the dry heated atmosphere.

4. Apparatus utilizing a method of locating defective fuel rods of a fuel element having a plurality of fuel rods in a liquid cooled reactor core comprising:
   a container filled with a liquid, a plurality of fuel rods supported in the container, the rods including end caps located at the lower end of the reactor core, means for rotating the rods substantially through 180°, means provided in the end caps of the rods for absorbing and retaining leakage liquid from the reactor core collecting in the end caps thereof upon rotation of the rods substantially through 180° by the rotating means, means for maintaining the raised end caps free from surrounding cooling liquid in contact with substantially the remainder of the fuel element, means for heating the raised end caps of the rods to evaporate the leakage liquid, means for measuring the temperatures of the end caps of the rods, and means for simultaneously indicating the temperatures of the end caps to detect the temperature differences between defective and non-defective rods.

5. The apparatus of claim 4 including means for supporting the rods in said container with the end caps having the leakage liquid being disposed at the upper ends of the rods, said means for heating the end caps including means for enclosing the upper ends of the rods in said container in a dry heated atmosphere.

6. The apparatus of claim 5 wherein said means for enclosing the upper ends of the rods includes an enclosure, and a source of heated gas connected to said enclosure.

7. The apparatus of claim 6 wherein said means for absorbing and retaining leakage liquid comprises a capillary element within said end caps.

8. The apparatus of claim 6 including a heat radiating element within said enclosure.

9. The apparatus of claim 5 including a cup shaped element within said end caps to collect said leakage liquid.

10. The apparatus of claim 7 wherein said rods include fission gas spaces adjacent said end caps collecting further leakage liquid, said capillary element having an extension into said fission gas spaces.

11. The apparatus of claim 5 wherein said means for measuring temperatures includes an infra-red measuring device, and said means for simultaneously indicating said temperatures includes a visual display device connected to said infra-red device and displaying said end cap temperatures as an array of light and darker areas representing said temperatures differences between defective and non-defective rods during a given period of time.

* * * * *